United States Patent
Hibino et al.

(10) Patent No.: US 7,326,486 B2
(45) Date of Patent: Feb. 5, 2008

(54) SEPARATOR FOR FUEL CELL

(75) Inventors: Kouetsu Hibino, Nisshin (JP); Toshiyuki Suzuki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 229 days.

(21) Appl. No.: 10/624,527

(22) Filed: Jul. 23, 2003

(65) Prior Publication Data

US 2004/0072058 A1  Apr. 15, 2004

(51) Int. Cl.
*H01M 2/14* (2006.01)

(52) U.S. Cl. .......................... 429/39; 429/34; 429/38; 429/129; 429/143; 429/147

(58) Field of Classification Search .................. 429/34, 429/39, 38, 129, 143, 147
See application file for complete search history.

(56) References Cited

U.S. PATENT DOCUMENTS 6,322,915 B1 * 11/2001 Collins et al. ................ 429/13
6,387,558 B1 *  5/2002 Mizuno et al. ............... 429/34

FOREIGN PATENT DOCUMENTS

| CA | 2 263 395 C | 12/1999 |
|---|---|---|
| JP | 10-284096 A | 10/1998 |
| JP | 2000-082482 A | 3/2000 |
| JP | 2000 090947 | 3/2000 |
| JP | 2000-182631 A | 6/2000 |
| JP | 2002 198069 | 7/2002 |
| JP | 2004 055220 | 2/2004 |

OTHER PUBLICATIONS

Japanese Language Version of Japanese Office Action for Appln. No. JP2002-214686 Issued Nov. 28, 2006.
English Language Translation of Japanese Office Action for Appln. No. JP2002-214686 issued Nov. 28, 2006.
Copy of Canadian Office Action for Appln. No. 2,435,084, issued Aug. 11, 2006.

* cited by examiner

*Primary Examiner*—Jane Rhee
(74) *Attorney, Agent, or Firm*—Kenyon & Kenyon LLP

(57) ABSTRACT

A fuel cell-purposed separator has a gas channel that includes a plurality of stages connected via turnaround portions. A bypass is provided which connects an upstream-side stage to a downstream side stage. After flowing through the downstream-side stage, a gas is let out of a gas outlet. The fuel cell-purposed separator thus constructed curbs a gas concentration drop on the downstream side in the gas channel.

10 Claims, 3 Drawing Sheets

SEPARATOR FOR FUEL CELL

The disclosure of Japanese Patent Applications No. 2002-214686 filed on Jul. 24, 2002, including the specification, drawings and abstract is incorporated herein by reference in its entirety.

BACKGROUND OF THE INVENTION

1. Field of the Invention

The invention relates to a separator for use in a fuel cell.

2. Description of the Related Art

A solid polymer electrolyte type fuel cell battery is formed by a stack of membrane-electrode assemblies (MEAs) and separators. A membrane-electrode assembly includes an electrolyte membrane formed by an ion exchange membrane, an electrode (anode, or fuel electrode) formed by a catalytic layer that is disposed on a surface of the electrolyte membrane, and an electrode (cathode, or air electrode) formed by a catalytic layer that is disposed on another surface of the electrolyte membrane. An anode-side diffusion layer and a cathode-side diffusion layer are provided between the membrane-electrode assembly and separators. A separator has a fuel gas channel for supplying a fuel gas (hydrogen) to the anode, and an oxidizing gas channel for supplying an oxidizing gas (oxygen, or air in ordinary cases) to the cathode. Each separator further has a coolant channel for passing a coolant (that is normally cooling water). A cell is formed by stacking a membrane-electrode assembly and separators, and a module is formed by at least one cell. Modules are stacked to form a cell stack. Terminals, insulators and end plates are disposed on two opposite ends of the cell stack in the stacking direction. The cell stack is clamped in the cell stacking direction, and is fixed through the use of fastener members (e.g., tension plates) that extend outside the cell stack in the cell stacking direction, and bolts and nuts. In this manner, a stack is formed. On the anode side of each cell, a reaction occurs in which hydrogen is separated into hydrogen ions (protons) and electrons. The hydrogen ions migrate through the electrolyte membrane to the cathode side. On the cathode side, a reaction mentioned below occurs in which water is produced from oxygen, hydrogen ions and electrons (i.e., the electrons produced on the anode of the adjacent MEA come to the cathode through the separator, or the electrons produced on the anode of the cell disposed at an end in the cell stacking direction come to the cathode of the cell at the opposite end via an external circuit).

Anode side:  $H_2 \rightarrow 2H^+ + 2e^-$

Cathode side: 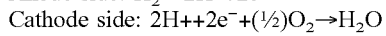 $2H^+ + 2e^- + (\frac{1}{2})O_2 \rightarrow H_2O$

For example, Japanese Patent Application Laid-open No. 2000-82482 discloses a fuel cell as schematically illustrated in FIG. 4 in which a gas inlet (e.g., an oxidizing gas inlet 28a) and a gas outlet (e.g., an oxidizing gas outlet 28b) are located at the same side of a separator 18 (the same edge side of a rectangular separator), and a gas channel (e.g., an oxidizing gas channel 28) has a serpentine channel configuration having a plurality of turnaround portions (e.g., a turnaround portion 28c of the oxidizing gas channel).

However, related-art fuel cells having serpentine gas channels have the following drawbacks. (1) Due to the great lengths of gas channels, the gas concentration greatly differs between the gas inlet and the gas outlet; that is, on the downstream side, the gas concentration decreases, and the state of electric power generation degrades. In Japanese Patent Application Laid-open No. 2000-82482, this problem is solved by providing an intermediate manifold. However, the provision of the intermediate manifold impedes size reduction of the fuel cell. (2) The IV characteristic (current-voltage characteristic) of the fuel cell deteriorates sharply and significantly in a high current density region. Causes for this deterioration are considered to be gas supply shortage and flooding caused by large production of water.

SUMMARY OF THE INVENTION

Accordingly, it is an object of the invention to provide a fuel cell separator capable of curbing the gas concentration drop on a downstream side in a serpentine gas passage of a fuel cell.

As an embodiment of the invention, there is provided a fuel cell-purposed separator that has a gas passage having a plurality of stages that are connected via a turnaround portion, and a bypass that connects an upstream-side stage of the gas passage to a downstream-side stage of the gas passage. The separator is designed so that a gas, after passing through the downstream-side stage, flows out of a gas outlet.

According to another embodiment of the invention, there is provided a fuel cell-purposed separator in which a gas inlet and a gas outlet are located at the same side of the separator, and in which a gas passage has a plurality of turnaround portions. The separator is provided with a bypass that connects a most upstream-side turnaround portion of the gas passage to a most downstream-side turnaround portion of the gas passage.

According to the fuel cell-purposed separator as described above, since the bypass is provided, a high-concentration gas present at the upstream side is conducted to the downstream side via the bypass, so that the gas concentration drop at the downstream side is curbed and therefore the state of power generation improves. Furthermore, at the time of a high current density, a large amount of water produced at the upstream side flows to the downstream side via the bypass, and therefore can be promptly discharged from the system. Hence, it is possible to prevent an undesired event where, as in the related-art technology, reaction-produced water impedes the supply of a gas to an electrode and therefore reduces the power generation performance.

Furthermore, in a fuel cell-purposed separator in which the gas inlet and the gas outlet are located at the same side of the separator, the most upstream-side turnaround portion and the most downstream-side turnaround portion can be located at a side of the separator (the same side) that is opposite from the gas inlet and the gas outlet. Therefore, the bypass can be arranged in a perimeter portion of an electric power generation region so that a gas passage region and the electric power generation region are not substantially reduced, and so that the power generation performance of the fuel cell will not be substantially reduced and the compact designing of the fuel cell will not be substantially impeded.

BRIEF DESCRIPTION OF THE DRAWINGS

The above mentioned and other objects, features, advantages, technical and industrial significance of this invention will be better understood by reading the following detailed description of preferred embodiments of the invention, when considered in connection with the accompanying drawings, in which.

DESCRIPTION OF THE EXEMPLARY EMBODIMENTS

In the following description and the accompanying drawings, the present invention will be described in more detail with reference to an exemplary embodiment.

A fuel cell battery in accordance with the invention will be described below with reference to FIGS. 1 to 3. The fuel cell in accordance with the invention is a solid polymer electrolyte type fuel cell battery 10. The fuel cell battery 10 is installed in, for example, a fuel cell motor vehicle. The fuel cell battery 10 may also be used for purposes other than the installation in motor vehicles.

Figure 1:
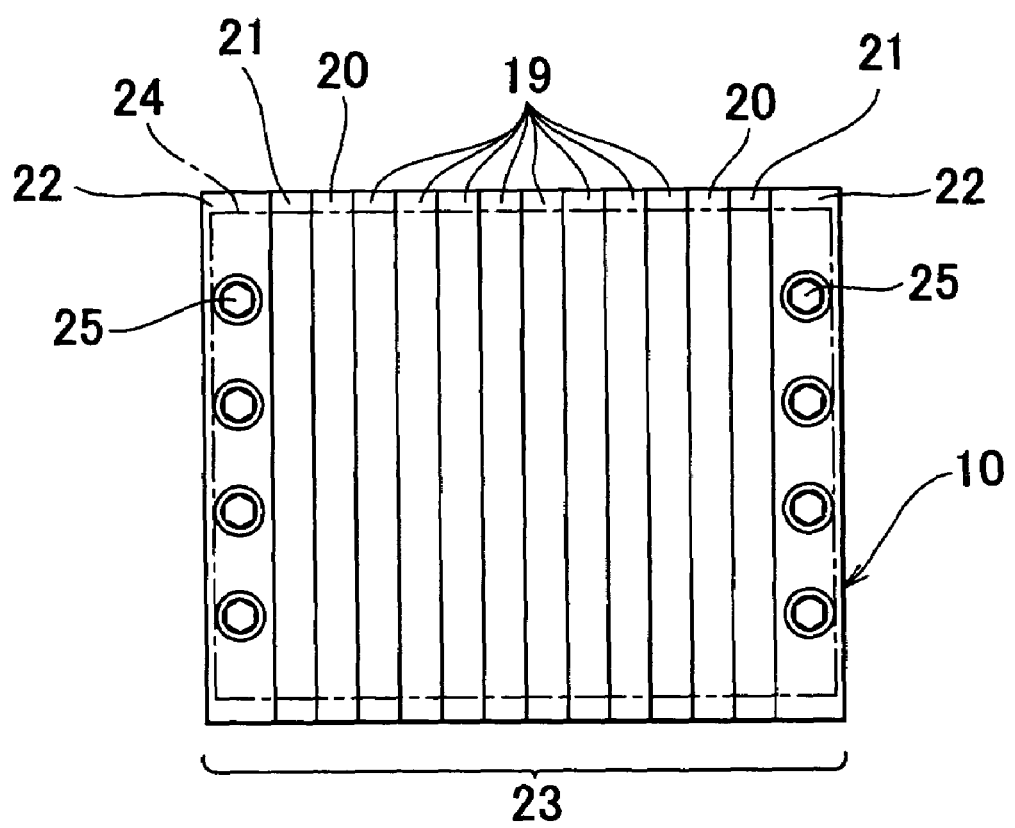
FIG. 1 is a side view of a fuel cell stack.
Figure 2:
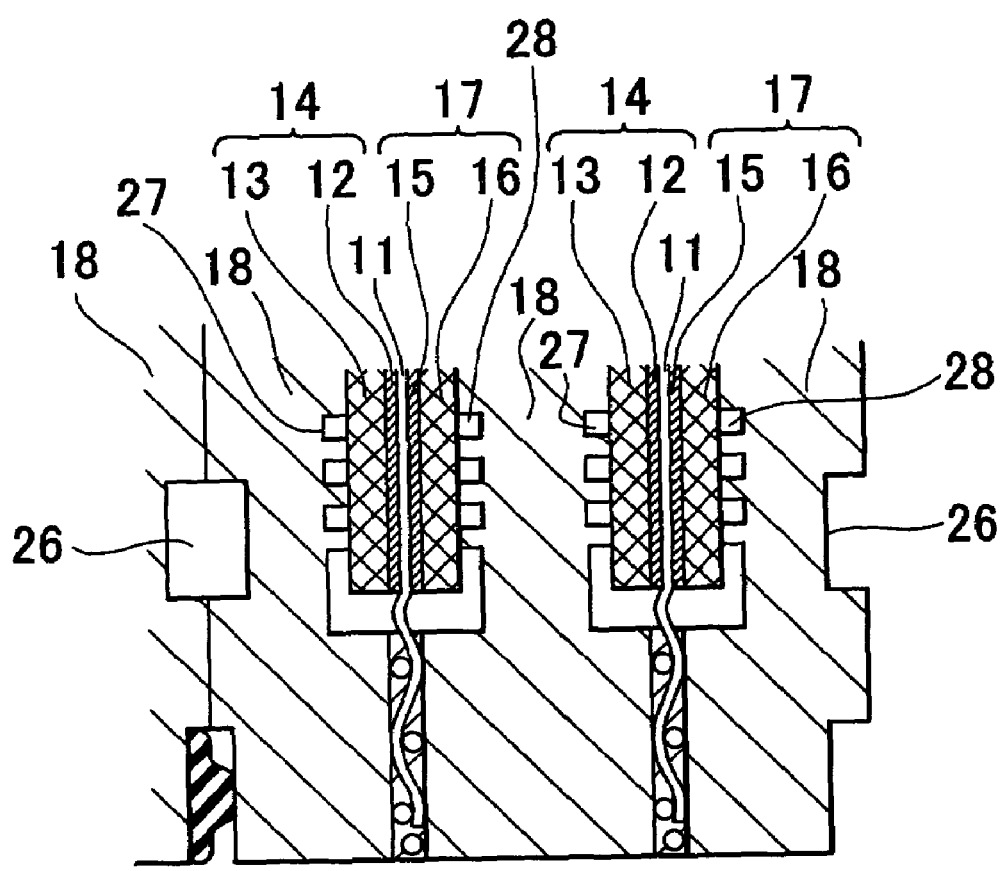
FIG. 2 is a enlarged partial section of the stack shown in FIG. 1.

As shown in FIGS. 1 and 2, the solid polymer electrolyte type fuel cell battery 10 has a stack of membrane-electrode assemblies (MEAs) and separators 18. Each membrane-electrode assembly includes an electrolyte membrane 11 having an ion exchange membrane, an electrode (anode, or fuel electrode) 14 having a catalytic layer 15 disposed on a surface of the electrolyte membrane 11, and an electrode (cathode, or air electrode) 17 having a catalytic layer 15 disposed on another surface of the electrolyte membrane 11. Anode-side diffusion layers 13 and cathode-side diffusion layers 16 are provided between the membrane-electrode assemblies and the separators 18. Cells 19 are formed by stacking membrane-electrode assemblies and separators 18. A module is formed by at least one cell. Modules are stacked to form a cell stack. Terminals 20, insulators 21 and end plates 22 are disposed on two opposite ends of the cell stack in the stacking direction. The cell stack is clamped in the cell stacking direction, and is fixed by a fastener member (e.g., tension plates 24) that extends outside the cell stack in the cell stacking direction, and bolts and nuts 25. In this manner, a stack 23 is formed.

Each separator 18 has a fuel gas channel 27 for supplying a fuel gas (hydrogen) to the anode 14, and an oxidizing gas channel 28 for supplying an oxidizing gas (oxygen, or air in ordinary cases) to the cathode 17. Each separator further has a coolant channel 26 for passing a coolant (cooling water in ordinary cases). A coolant channel 26 is provided separately for each cell or for each set of cells (e.g., for each module). As the gasses in the gas channels 27, 28 flow downstream, the concentrations thereof gradually decrease due to the consumption for electric power generation. The gas channels 27, 28 are stepwise narrowed toward the downstream side, in order to maintain a certain flow rate.

Figure 3:
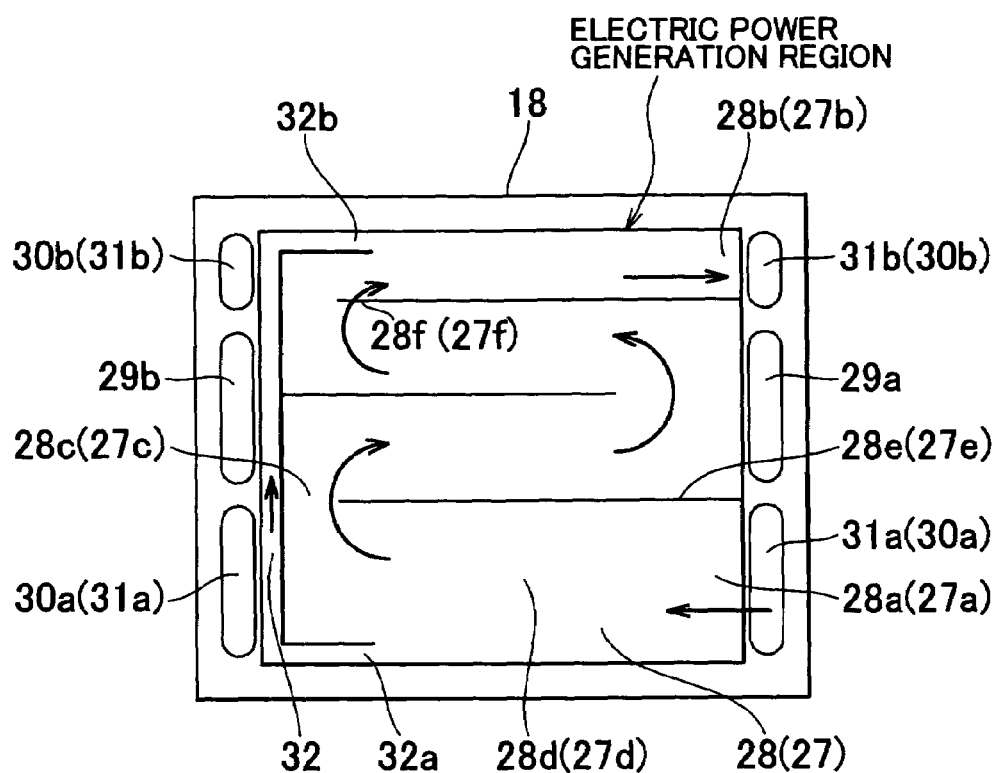
FIG. 3 is a front elevation of a fuel cell-purposed separator in accordance with an embodiment of the invention.
Figure 4:
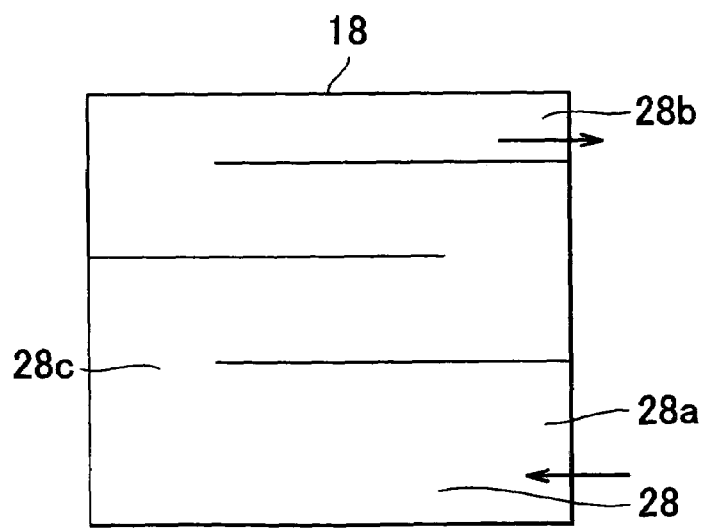
FIG. 4 is a front elevation of a related-art fuel cell-purposed separator.

As shown in FIG. 3, the fuel gas channel 27 has a gas inlet 27a, a gas outlet 27b, at least one turnaround portion 27c, and a plurality of stages 27d (linear channel portions) connecting between turnaround portions 27c or connecting between a turnaround portion 27c and the gas inlet 27a or the gas outlet 27b. Similarly, the oxidizing gas channel 28 has a gas inlet 28a, a gas outlet 28b, at least one turnaround portion 28c, and a plurality of stages 28d (linear channel portions) connecting between turnaround portions 28c or connecting between a turnaround portion 28c and the gas inlet 28a or the gas outlet 28b.

Each separator 18 has coolant manifolds 29a, 29b, inlet-side and outlet-side fuel gas manifolds 30a, 30b, and inlet-side and outlet-side oxidizing gas manifolds 31a, 31b. The inlet-side coolant manifold 29a is connected in communication to a coolant inlet of the coolant channel 26. The outlet-side coolant manifold 29b is connected in communication to a coolant outlet of the coolant channel 26. The inlet-side fuel gas manifold 30a is connected in communication to the fuel gas inlet 27a of the fuel gas channel 27. The outlet-side fuel gas manifold 30b is connected in communication to the fuel gas outlet 27b of the fuel gas channel 27. The inlet-side oxidizing gas manifold 31a is connected in communication to the oxidizing gas inlet 28a of the oxidizing gas channel 28. The outlet-side oxidizing gas manifold 31b is connected in communication to the oxidizing gas outlet 28b of the oxidizing gas channel 28.

The separators 18 are formed from a carbon, or a metal, or a metal and a resin, or an electrically conductive resin, or a combination thereof. The gas channels 27, 28 are formed by, for example, grooves, recesses, or spaces between band-like protrusions formed in the separators 18. Normally, the stages 27d, 28d include a plurality of channel groups. In the case of a serpentine channel configuration, ribs 27e, 28e are formed as partitions for the gasses between one stage 27d, 28d and another stage 27d, 28d. Each rib 27e, 28e extends from one side of a power generation region of the separator to the vicinity of an opposite side of the power generation region. The distal end of each rib 27e, 28e and the opposite side define, therebetween, the channel width of a turnaround portion of the serpentine channel. Therefore, each gas channel 27, 28 of a separator 18 is formed by a side wall of the separator 18 and one rib 27e or 28e, or by two ribs 27e, 27e or 28e, 28e as in a central portion of the separator 18.

At least one of the fuel gas channel 27 and the oxidizing gas channel 28 (e.g., the oxidizing gas channel 28 in FIG. 3) has a bypass 32 that extends from an upstream-side stage 27d, 28d to a downstream-side stage 27d, 28d. The gas passing through the bypass 32 flows through the downstream-side stage 27d, 28d, and then flows out of the gas outlet 27b, 28b. In the structure shown in FIG. 3, the upstream-side stage 27d, 28d is the most upstream stage, and the downstream-side stage 27d, 28d is the most downstream stage. However, the upstream-side stage 27d, 28d does not need to be the most upstream stage, and the downstream-side stage 27d, 28d does not need to be the most downstream stage.

The bypass 32 is formed in the separator 18, and within a power generation region of the cell (i.e., a region that has the electrolyte membrane 11 and a gas supply channel, and therefore allows electric power generation). An inlet 32 of the bypass 32 opens at a site in the upstream-side stage 27d, 28d where the reaction-produced water is most likely to reside (if the separator surface is parallel to the direction of gravity, the site is a lower portion of the stage since the produced water is most likely to reside in the lower portion of the stage due to gravity). An outlet 32b of the bypass 32 is formed near an upstream end of the downstream-side stage 27d, 28d. Therefore, the water flowing out of the bypass 32 passes through the downstream-side stage 27d, 28d (including further downstream stages if any), and therefore causes a gas-rich condition in the stage 27d, 28d and improves the state of power generation. After that, the water is let out of the gas outlet 27b, 28b. If the separator surface is parallel to the direction of gravity, it is preferable to locate the outlet 32b of the bypass 32 downstream of the distal end of the partition rib 27e, 28e of the downstream-side stage 27d, 28d so that the water falling from the outlet 32b of the bypass 32 will be received by the partition rib 27e, 28e. In FIG. 3, the bypass outlet portion 32b of the bypass 32 and a distal end portion 28f, 27f of the most downstream partition rib overlap with each other in a horizontal direction.

In the embodiment shown in FIG. 3, as for at least one of the gas channels 27, 28 (e.g., the oxidizing gas channel 28), the gas inlet 27a, 28a and the gas outlet 27b, 28b are located on the same side (the same edge side) of the separator 18. However, it is not altogether necessary that the gas inlet 27a, 28a and the gas outlet 27b, 28b be located on the same side of the separator 18. If the gas inlet 27a, 28a and the gas outlet 27b, 28b are located on the same side of the separator 18 as shown in FIG. 3, the most upstream-side turnaround portion 27c, 28c and the most downstream-side turnaround portion 27c, 28c are located on a side (the same side) that is opposite from the gas inlet and the gas outlet. As a result, the bypass 32 can be arranged in a perimeter portion of the electric power generation region (that may be within the power generation region or may be outside the power generation region and along a boundary of the region) so that the gas channel region and the power generation region are not reduced at all or not substantially reduced, and therefore the power generation performance of the fuel cell will not be substantially reduced and the compact designing of the fuel cell will not be substantially impeded.

The separator 18 may be disposed parallel to the direction of gravity, or may instead be disposed in a direction perpendicular to the direction of gravity (in a horizontal direction). If the separator 18 is disposed parallel to the direction of gravity, a vertical positional relationship occurs. In the example shown in FIG. 3, the gas inlet 28a is located in a lower portion of the separator, and the gas outlet 28b is located in an upper portion of the separator. If the separator 18 is disposed parallel to the direction of gravity and the gas outlet is located in an upper portion, a gas stream is utilized to cause a movement through the bypass 32 to the downstream-side stage while overcoming gravity. The bypass 32 is located in a perimeter portion of the power generation region, and has a less passage width than a gas channel, and therefore has a greater gas flow velocity. Therefore, it is possible for a gas stream to move water to the downstream side overcoming gravity.

Operation of the invention will next be described. Due to the provision of the bypass 32 extending from the upstream-side stage 27d, 28d to the downstream-side stage 27d, 28d of the gas channel 27, 28, the gas in the upstream-side stage which has a high gas concentration (a high hydrogen concentration in the case of the fuel gas, or a high oxygen concentration in the case of the oxidizing gas) flows to the downstream-side stage 27d, 28d via the bypass 32, and is then let out of the gas outlet 27b, 28b. Thus, the gas concentration drop in the downstream-side stage 27d, 28d is curbed. As a result, the state of power generation regarding the downstream-side stage 27d, 28d improves in comparison with the conventional technology in which the state of power generation deteriorates in the downstream-side stage due to a gas concentration drop. Therefore, the power generation characteristic as a whole improves according to the invention.

In a high current density region, a relatively large amount of water is produced in the upstream-side stage 27d, 28d where the gas concentration is high.

The large amount of water flows to the downstream-side stage 27d, 28d via the bypass 32, and is therefore promptly discharged from the system. A large amount of reaction-produced water is most likely to reside in the most upstream stage. Therefore, passing the water to the downstream-side stage 27d, 28d via the bypass 32 and thereby promptly discharging the water out of the system achieves a great advantage in preventing the impediment of electric power generation caused by reaction-produced water. If the water produced in an upstream-side stage passes through an internal channel (i.e., a portion of a serpentine gas channel which extends in parallel to the bypass) as in the conventional technology, low electric power generation performance results since channel portions where water exists cannot contribute to power generation. However, this problem can be curbed or avoided according to the invention.

Since the fuel cell-purposed separator of the embodiment is provided with the bypass, a high-concentration gas from the upstream side flows to the downstream side via the bypass, thereby curbing the gas concentration drop at the downstream side and improving the state of power generation at the downstream side.

Furthermore, at the time of a high current density, a large amount of water produced at the upstream side flows to the downstream side via the bypass, and therefore can be promptly discharged from the system. Hence, it is possible to prevent reaction-produced water from impeding the supply of a gas to an electrode and therefore curb a reduction in power generation performance. Still further, since the gas inlet and the gas outlet are located at the same side of the separator, the most upstream-side turnaround portion and the most downstream-side turnaround portion are located at a side of the separator (the same side thereof) that is opposite from the gas inlet and the gas outlet. Therefore, the bypass can be arranged in a perimeter portion of the electric power generation region so that the gas channel region and the electric power generation region are not substantially reduced, and so that the power generation performance of the fuel cell will not be substantially reduced and the compact designing of the fuel cell will not be substantially impeded.

Furthermore, if the separator is disposed parallel to the direction of gravity so that the gas inlet is located in a lower portion and the gas outlet is located in an upper portion of the separator, the water produced in the upstream side can be passed by a gas stream to the downstream side via the bypass.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A separator for a fuel cell, comprising:
    a gas passage having a plurality of stages that are connected via a turnaround portion, the gas passage facing an electrode of the fuel cell; and
    a bypass that connects an upstream-side stage of the gas passage to a downstream-side stage of the gas passage and that causes a gas that flows in via an inlet of the bypass to flow out of an outlet of the bypass;
    wherein a gas inlet of the separator and a gas outlet of the separator are located at a same side of the separator and opposite to the bypass.

2. The separator according to claim 1, wherein the gas passage is defined by a side wall of the separator and a rib, or by two ribs.

3. The separator according to claim 2, wherein the separator is disposed parallel to a direction of gravity, and the gas inlet to the separator is located in a lower portion of the separator, and the gas outlet from the separator is located in an upper portion of the separator.

4. The separator according to claim 3, wherein a bypass outlet of the bypass and a distal end of a downstream-side partition rib overlap in a horizontal direction.

5. The separator according to claim 1, wherein the separator is disposed parallel to a direction of gravity, and the gas inlet to the separator is located in a lower portion of the separator, and the gas outlet from the separator is located in an upper portion of the separator.

6. A separator for a fuel cell comprising:
a gas passage having a plurality of turnaround portions, the gas passage facing an electrode of the fuel cell; and
a bypass that connects a most upstream-side turnaround portion of the gas passage to a most downstream-side turnaround portion of the gas passage,
wherein a gas inlet to the separator and a gas outlet from the separator are located at a same side of the separator and opposite to the bypass.

7. The separator according to claim 6, wherein the gas passage is defined by a side wall of the separator and a rib, or by two ribs.

8. The separator according to claim 7, wherein the separator is disposed parallel to a direction of gravity, and the gas inlet to the separator is located in a lower portion of the separator, and the gas outlet from the separator is located in an upper portion of the separator.

9. The separator according to claim 8, wherein a bypass outlet of the bypass and a distal end of a most downstream-side partition rib overlap in a horizontal direction.

10. The separator according to claim 6, wherein the separator is disposed parallel to a direction of gravity, and the gas inlet to the separator is located in a lower portion of the separator, and the gas outlet from the separator is located in an upper portion of the separator.

* * * * *

UNITED STATES PATENT AND TRADEMARK OFFICE
CERTIFICATE OF CORRECTION

| | | |
|---|---|---|
| PATENT NO. | : 7,326,486 B2 | Page 1 of 1 |
| APPLICATION NO. | : 10/624527 | |
| DATED | : February 5, 2008 | |
| INVENTOR(S) | : Kouetsu Hibino et al. | |

It is certified that error appears in the above-identified patent and that said Letters Patent is hereby corrected as shown below:

In the Title Page: After "(65)   Prior Publication Data

US 2004/0072058 A1   Apr. 15, 2004"

insert:   --(30)   Foreign Application Priority Data

July 24, 2002   (JP)   2002-214686--.

| Column | Line | |
|---|---|---|
| 1 | 50 | Change "Cathode side: $2H+ + 2e^- + (1/2)O_2 \rightarrow H_2O$" to --Cathode side: $2H^+ + 2e^- + (1/2)O_2 \rightarrow H_2O$--. |

Signed and Sealed this

First Day of July, 2008

JON W. DUDAS
*Director of the United States Patent and Trademark Office*